United States Patent Office 3,313,593
Patented Apr. 11, 1967

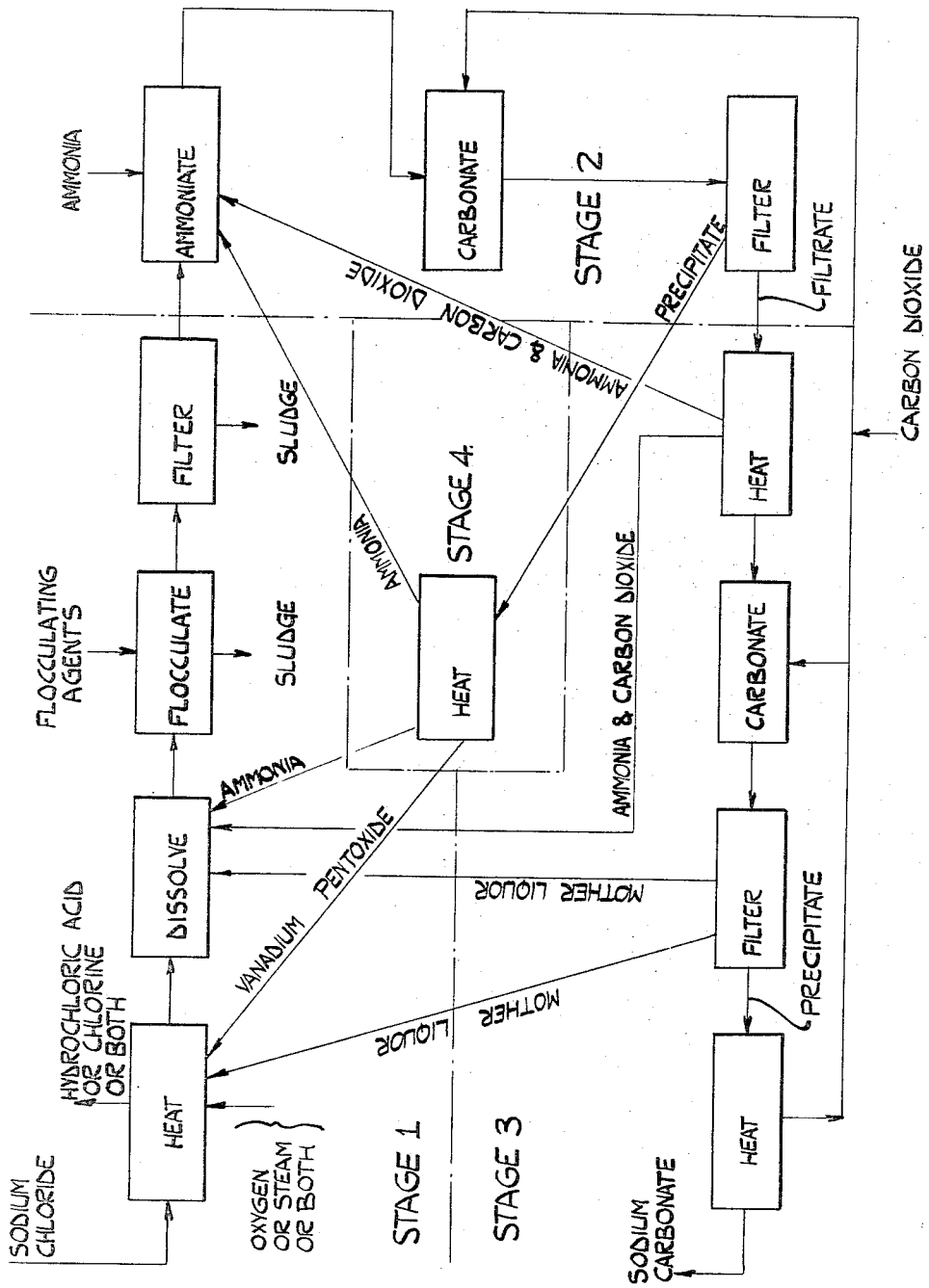

3,313,593
PROCESS FOR THE PRODUCTION OF SODIUM CARBONATE AND HYDROCHLORIC ACID AND/OR CHLORINE
Willem Hendrik Aarts, Johannesburg, Transvaal, Republic of South Africa, assignor to African Explosives and Chemical Industries, Limited, Johannesburg, Transvaal, Republic of South Africa
Filed Aug. 19, 1963, Ser. No. 303,035
Claims priority, application Republic of South Africa, Aug. 23, 1962, 62/3,578
8 Claims. (Cl. 23—63)

This invention relates to a process for the production of any of the compounds sodium carbonate, sodium bicarbonate, hydrochloric acid, and chlorine, separately or simultaneously.

Sodium carbonate is usually manufactured by the Solvay ammonia-soda process. This process, as is very well known, results in the production of calcium chloride or ammonium chloride as by-products. These by-products have limited uses in comparison with the uses of sodium carbonate itself.

It is an object of the invention to provide a process for the production of sodium carbonate, and which produces useful by-products.

It is a further object of this invention to provide a process for the production of hydrochloric acid or chlorine, or both simultaneously.

According to the invention, a process for the production of any of the compounds sodium bicarbonate, sodium carbonate, hydrochloric acid, and chlorine includes the steps of heating sodium chloride in the presence of available oxygen and in the presence of an intermediate reactant to combine with the sodium ions of the sodium chloride to free the chlorine ions, to produce hydrochloric acid or chlorine, and carbonating the remaining material to produce sodium bicarbonate or sodium carbonate.

In the making of sodium carbonate and hydrochloric acid, the available oxygen may be provided in the form of steam, so that sodium chloride and carbon dioxide and water (steam) serve as primary materials. On the other hand, in the making of sodium carbonate and chlorine, the available oxygen may be provided in the form of oxygen gas, so that sodium chloride and carbon dioxide and oxygen (from air if desired) serve as primary materials.

The overall reactions may be represented as follows:

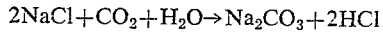

for the production of sodium carbonate and hydrochloric acid; and

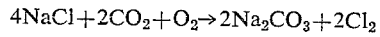

for the production of sodium carbonate and chlorine.

The compound formed by the combination of a sodium ion and an anion derived from the intermediate reactant may be treated with ammonia, carbon dioxide and water to provide sodium bicarbonate or sodium carbonate and an ammonium salt having an anion derived from the intermediate reactant.

Heating of the sodium bicarbonate produces sodium carbonate, carbon dioxide and water, as will appear from equations given hereafter. The carbon dioxide and water may be recirculated for further use.

The original reactant may be recovered from the ammonium salt formed during the ammoniation.

We have found a suitable intermediate reactant to be vanadium pentoxide, which reacts with the sodium ions of sodium chloride to form the "compound" referred to above, namely sodium metavanadate. The "ammonium salt" referred to above is then ammonium metavanadate which upon heating produces ammonia, water, and vanadium pentoxide, all of which may be recirculated for further use.

The invention will now be described in greater detail with reference to the following chemical equations, which are given by way of illustration, while we do not intend to limit the scope of the invention to the particular embodiment described, and do not wish to be bound to any theoretical explanation.

Whether it is preferred to produce hydrochloric acid or chlorine, the process may comprise four stages.

The first stage includes the step of reacting sodium chloride with vanadium pentoxide and available oxygen at a temperature of at least 250° C. to form sodium metavanadate and hydrochloric acid or chlorine.

For example, if it is preferred to produce hydrochloric acid, the first stage reaction includes the step of reacting vanadium pentoxide with steam and sodium chloride according to the equation:

If it is preferred to produce chlorine, then the first stage reaction comprises reacting vanadium pentoxide with oxygen and sodium chloride according to the equation:

The second stage includes the successive steps of ammoniating and carbonating the sodium metavanadate solution produced in the first stage to produce a precipitate of ammonium metavanadate and a mother liquor containing sodium bicarbonate or sodium carbonate, according to the equations:

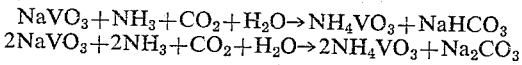

The third stage includes the steps of applying heat to drive off excess ammonia and carbon dioxide, followed by cooling and further carbonation to precipitate the sodium bicarbonate or sodium carbonate, followed by conversion of the precipitated bicarbonate to sodium carbonate by the application of heat, according to the reaction:

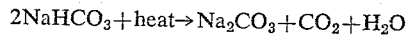

The fourth stage comprises the recovery of ammonia and vanadium pentoxide from the ammonium metavanadate precipitated at the second stage by the application of heat according to the reaction:

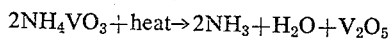

During this stage of the process, the ammonia evolved may be partly oxidised by the vanadium pentoxide formed, to produce nitrogen gas, water and vanadium oxides, according to the following reactions:

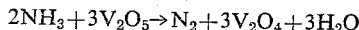

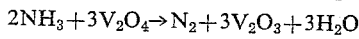

The reduced vanadium oxides are readily reoxidised to vanadium pentoxide if adequate oxygen or air supplies are available, according to the reactions:

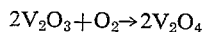

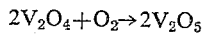

The process of the invention is set out below with reference to the accompanying flow diagram.

*Stage 1.*—Whether it is intended to produce hydrochloric acid or chlorine, or both, I have found that the sodium chloride and vanadium pentoxide may be intimately mixed or granulated as preferred and that in the presence of steam or oxygen and on heating, the reactions commence at about 250° C. and proceed to completion at about 700° C. It is surprising that these reactions should commence at such a comparatively low temperature in view of the fact that there are two solid reactants. In the production of hydrochloric acid the steam may be wet or dry or superheated, although it should not be more than stoichiometric if dry acid is required.

External heat is applied in any convenient manner and the products removed as preferred.

The sodium metavanadate produced is conveniently dissolved in recycled mother liquor and, depending on the purity of the sodium chloride used for the process and the purity of the sodium carbonate product desired, the solution may be treated in one or more steps by the addition of flocculating agents followed by filtration. As examples, the solution may be slightly ammoniated to precipitate certain undesired ingredients in the form of hydroxides, such as an iron hydroxide; subsequently or alternatively a soluble carbonate or carbon dioxide may be added to precipitate carbonates such as calcium and magnesium carbonate; furthermore barium chloride may be added to precipitate barium sulphate and so remove sulphate ions which are a frequent impurity in salt. The sludge obtained may be treated for the recovery of vanadium in any convenient manner.

*Stage 2.*—The solution from stage 1 is ammoniated in stoichiometric excess with, preferably, gaseous ammonia (which ammonia may be recycled from the first heating step in stage 3 as will appear later on), and the heat of reaction is removed for example by means of heat exchangers for use in other stages of the process. The solution is then carbonated using recycled carbon dioxide and waste carbon dioxide from a synthetic ammonia plant or other convenient source and maintained at a temperature below 20° C. in order to allow good precipitation to occur. The precipitate is removed by filtration and comprises the metavanadate of ammonia. It may be washed to free it of sodium salts such as the carbonate or chloride salts but this is not essential since the recirculation of such salts is in no way disadvantageous. The precipitate is then transferred to stage 4 for recovery of the vanadium as pentoxide.

*Stage 3.*—The solution from stage 2 is heated to concentrate it and also to drive off excess ammonia and carbon dioxide which are returned to stage 2, or partially to stage 1 where in stage 1 the heat of the gases aids the process of solution and where the presence of ammonia increases the solubility of the sodium metavanadate.

The solution is then further carbonated after cooling to precipitate sodium bicarbonate or sodium carbonate which is removed by filtration. The mother liquor may be reconcentrated and further carbonated after cooling to precipitate more sodium bicarbonate or sodium carbonate several times as preferred and is then recycled to stage 1 for dissolving the sodium metavanadate and for the recovery of sodium chloride.

The filter cake is washed to remove any remaining vanadium in it and this washing process is a convenient point for the addition of water to the system. The precipitate of sodium bicarbonate is heated to yield the sodium carbonate product and carbon dioxide, which is recycled.

*Stage 4.*—The ammonium metavanadate precipitate from stage 2 is heated until it decomposes and yields ammonia (which is, namely to the dissolving step in stage 1 and the ammoniating step in stage 2), water vapour, and vanadium pentoxide. This vanadium pentoxide may then be mixed or granulated with sodium chloride in stage 1. Some of the evolved ammonia is oxidized by the vanadium pentoxide to form nitrogen and water, as already hereinbefore described. The reduced vanadium oxides may be re-oxidised to vanadium pentoxide.

The following examples illustrate the invention:

*Example 1*

A granular mixture of $V_2O_5$ and NaCl, using 10% stoichiometric excess of NaCl, was prepared in a pan granulator. The mixture granulated well but a large quantity of water was found to be necessary, up to 40% by weight of the solids. The granules were dried at 70° C. and a reasonably firm product was obtained and analysed as follows (given in percent by weight):

| | Percent |
|---|---|
| $V_2O_5$ | 55.5 |
| NaCl | 40.0 |
| Moisture | 3.2 |

Granule size used in the experiment=1.5 to 4.0 mm. diameter.

Granules containing 161.4 g. of $V_2O_5$ and NaCl were placed in a reaction vessel and oxygen was passed through at 1 liter/min. The vessel was heated and when the temperature of the contents reached 160° C., dry steam at ambient pressure was passed through. Some HCl was given off when the temperature reached about 250° C. and heating was continued until the temperature reached 550° C. when no more HCl was being produced. The HCl was absorbed in a 20% NaOH solution and the conversion to $NaVO_3$ calculated on the amount of HCl liberated was 90.5% by weight. The granular structure of the initial mixture was found to have disappeared and the reaction vessel contained a finely crystallised product which was found to contain 68.3% by weight vanadium as $V_2O_5$ and 7.4% by weight NaCl.

*Example 2*

An intimately ground mixture of vanadium pentoxide and sodium chloride (in the ratio 1 mole $V_2O_5$ to 2 moles NaCl) was heated in an atmosphere of steam and air. It was shown that at 700° C. the reactants had been quantitatively transformed into sodium metavanadate and hydrogen chloride. Less than one percent of the hydrogen chloride had been oxidised to chlorine.

*Example 3*

On heating a mixture of 1 mole $V_2O_5$ with 2 moles NaCl in dry air, the formation of sodium metavanadate and the evolution of chlorine were rapid at 700° C. 63% of the theoretically quantity of chlorine could be collected conveniently, whereafter, on the introduction of steam into the atmosphere, sodium metavanadate was obtained in theoretical yield and the remaining chlorine was evolved as hydrogen chloride.

*Example 4*

91.1 g. of $NaVO_3$ were dissolved in 484 g. of water to give a 15.8% solution of $NaVO_3$ in water. $NH_3$ gas was condensed in this solution at 20° C. until the pH was 11.7. Then $CO_2$ gas was passed into the solution until the pH was 9.0 and $NH_4VO_3$ precipitated. The slurry was filtered and the precipitate was washed with a saturated solution of ammonium carbonate and subsequently dried and decomposed by heating slowly to 500° C.

The precipitation efficiency was 95.5% and the material had the following analysis after heating (given in percent by weight):

| | Percent |
|---|---|
| $V_2O_5$ | 98.4 |
| $Na_2O$ | 0.14 |

The mother liquid was subsequently treated to precipitate $NaHCO_3$ as follows:

Excess $NH_3$ and $CO_2$ and half of the water originally present were evaporated by passing a stream of air through the liquor at about 60° C. The liquor was then filtered. The solution was then slowly cooled to 10° C. while $CO_2$ was passed through. The precipitate obtained was washed with a saturated solution of $NaHCO_3$, dried and decomposed at 350° C. The product analysed as follows (given in percent by weight):

| | Percent |
|---|---|
| $Na_2CO_3$ | 99.7 |
| $V_2O_5$ | <0.007 |

This showed not only that pure $Na_2CO_3$ can be produced from NaCl using $NaVO_3$ as an intermediate but also that there is practically no loss of vanadium from the system, since all the vanadium present was precipitated as $NH_4VO_3$ or remained in solution in the mother liquid after precipitation of $NaHCO_3$.

It is an advantage of this invention that commercially pure sodium carbonate can be produced at the same time as hydrochloric acid and/or chlorine. It is a further advantage of this invention that as there is practically no loss of vanadium from the system an economically acceptable process for the production of sodium carbonate and/or sodium bicarbonate is provided.

Thus the invention provides a flexible process, which can be operated at ambient or other pressure, by means of a novel combination of chemical reactions.

The invention extends also to the products of a process according to the invention, whenever prepared with the aid of such a process.

I claim:

1. A process for the production of compounds of the group consisting of sodium carbonate, sodium bicarbonate, and chlorine, which includes the steps of heating sodium chloride in the presence of oxygen gas and vanadium pentoxide at a temperature between 250° C. and 700° C., so as to produce sodium metavanadate and chlorine; forming an aqueous solution of the sodium metavanadate and ammoniating and carbonating the solution so as to form a precipitate of ammonium metavanadate and a mother liquor contining sodium bicarbonate and sodium carbonate; and heating the precipitated ammonium metavanadate so as to recover ammonia and vanadium pentoxide.

2. A process according to claim 1, in which the aqueous solution of sodium metavanadate is formed by dissolving the sodium metavanadate in recycled mother liquor, and in which the solution is treated with a flocculating agent to precipitate undesired ingredients.

3. A process according to claim 1, in which the said mother liquor is carbonated and cooled so as to precipitate the sodium carbonate and sodium bicarbonate; and in which the precipitate is heated so as to convert the sodium bicarbonate to sodium carbonate.

4. A process according to claim 3, in which the precipitated ammonium metavanadate is removed from the mother liquor and the mother liquor is then heated so as to drive off excess ammonia and carbon dioxide, whereupon the mother liquor is cooled and carbonated for precipitating sodium carbonate and sodium bicarbonate.

5. A process for the production of compounds of the group consisting of sodium carbonate, sodium bicarbonate, and hydrochloric acid, which includes the steps of heating sodium chloride in the presence of steam and vanadium pentoxide at a temperature between 250° C. and 700° C., so as to produce sodium metavanadate and gaseous hydrochloric acid; forming an aqueous solution of the sodium metavanadate and ammoniating and carbonating the solution so as to form a precipitate of ammonium metavanadate and a mother liquor containing sodium bicarbonate and sodium carbonate; and heating the precipitated ammonium metavanadate so as to recover ammonia and vanadium pentoxide.

6. A process according to claim 5, in which the aqueous solution of sodium metavanadate is formed by dissolving the sodium metavanadate in recycled mother liquor, and in which the solution is treated with a flocculating agent to precipitate undesired ingredients.

7. A process according to claim 5, in which the said mother liquor is carbonated and cooled so as to precipitate the sodium carbonate and sodium bicarbonate; and in which the precipitate is heated so as to convert the sodium bicarbonate to sodium carbonate.

8. A process according to claim 7, in which the precipitated ammonium metavanadate is removed from the mother liquor and the mother liquor is then heated so as to drive off excess ammonia and carbon dioxide, whereupon the mother liquor is cooled and carbonated for precipitating sodium carbonate and sodium bicarbonate.

References Cited by the Examiner

UNITED STATES PATENTS

| 831,280 | 9/1906 | Handy | 23—19.1 |
|---|---|---|---|
| 1,129,029 | 2/1915 | Vogt | 23—19.1 |
| 1,570,299 | 1/1926 | Galt | 23—65 |
| 2,163,773 | 6/1939 | Bowman | 23—24 |
| 2,357,466 | 9/1944 | Frick | 23—19.1 |
| 2,576,101 | 11/1951 | Burwell | 23—19.1 |
| 3,206,276 | 9/1965 | Burwell et al. | 23—51 X |

OSCAR R. VERTIZ, *Primary Examiner.*

G. T. OZAKI, *Assistant Examiner.*